May 6, 1952 R. C. SHOEMAKER 2,595,896
CRANE BOOM ASSEMBLY
Filed Nov. 1, 1945 3 Sheets-Sheet 1
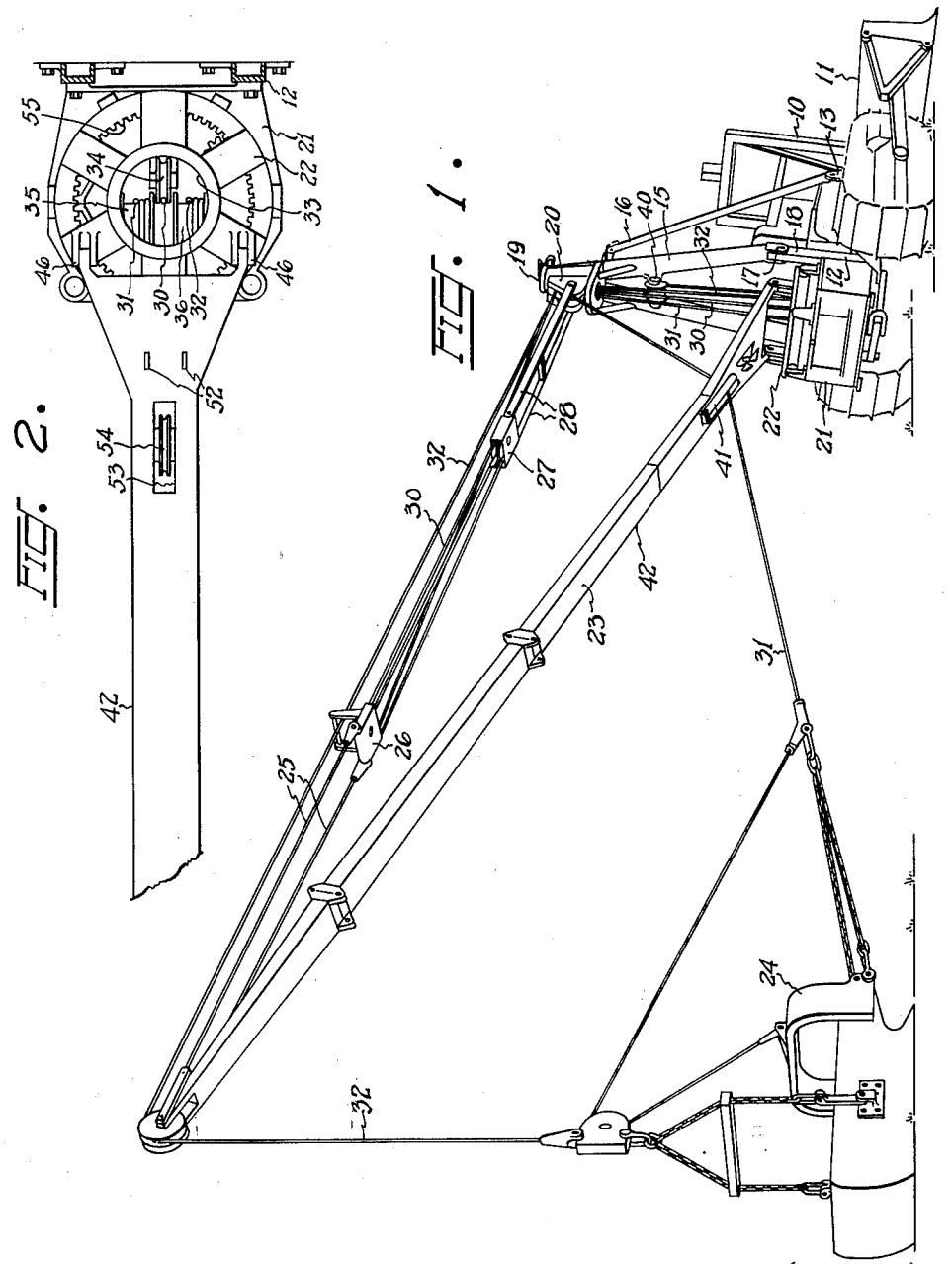
INVENTOR
ROBERT C. SHOEMAKER
BY
ATTORNEY

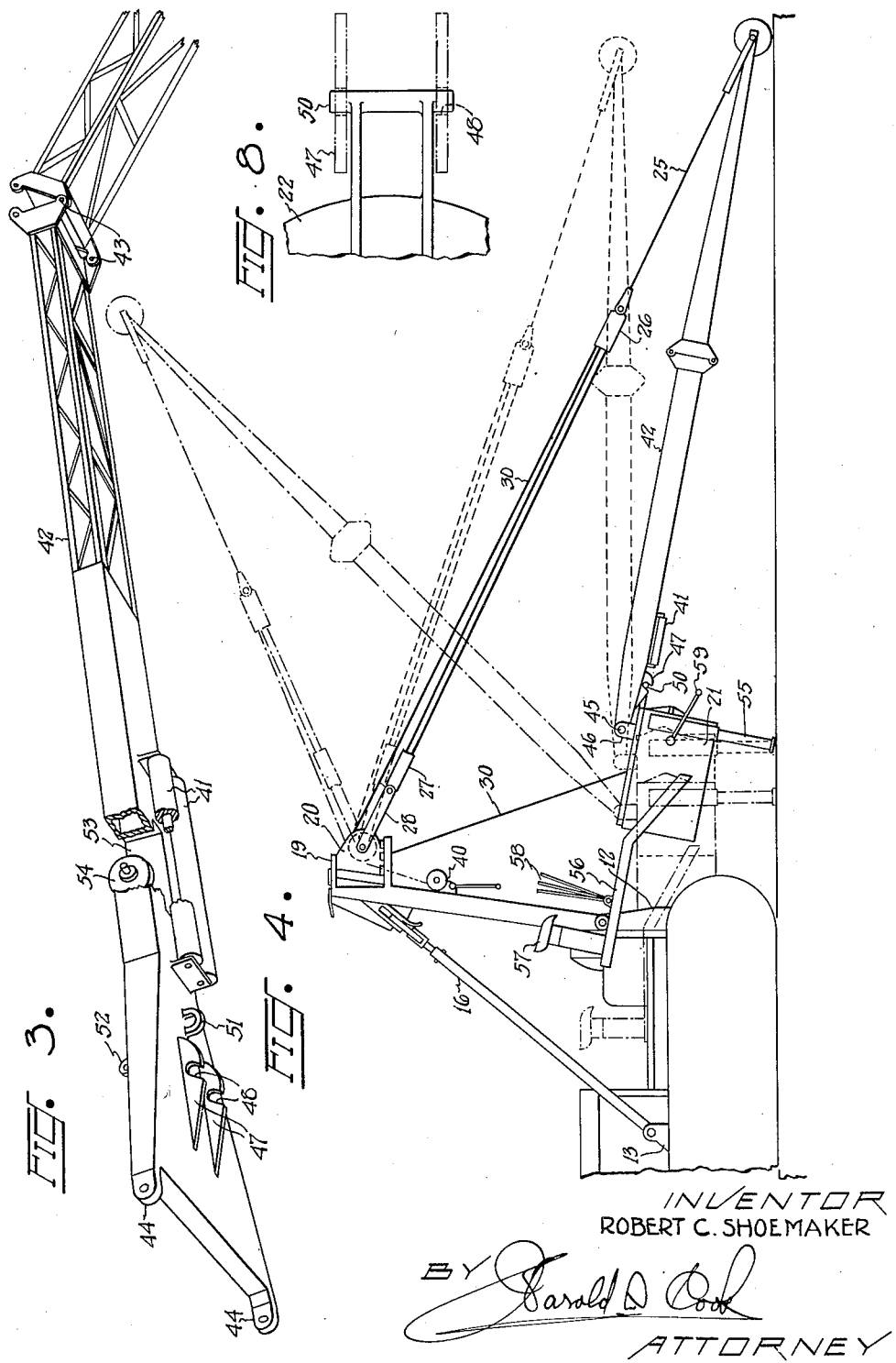

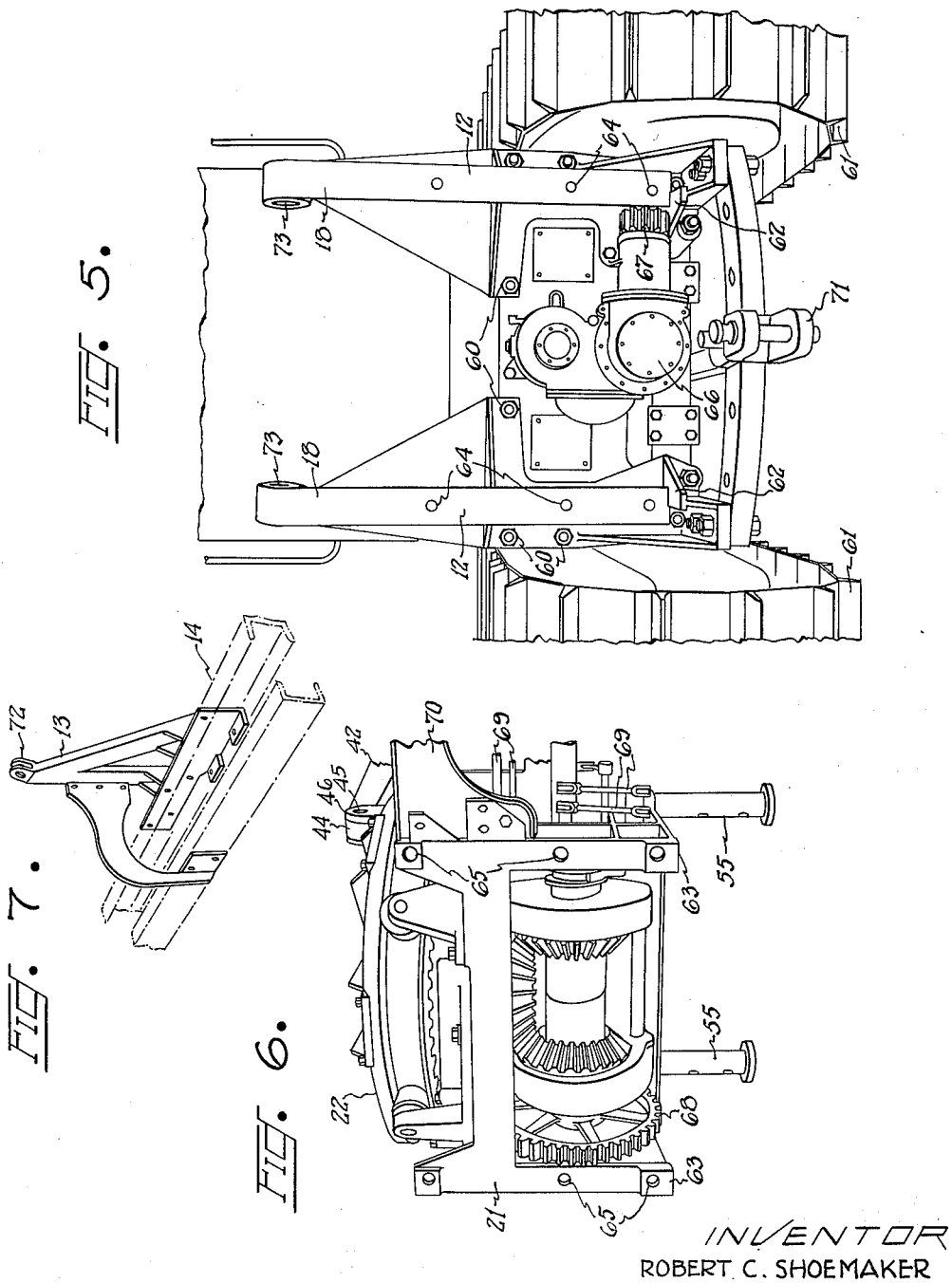

Patented May 6, 1952

2,595,896

UNITED STATES PATENT OFFICE 2,595,896

CRANE BOOM ASSEMBLY

Robert C. Shoemaker, Portland, Oreg., assignor to Hyster Company, Portland, Oreg., a corporation of Oregon Application November 1, 1945, Serial No. 626,114

14 Claims. (Cl. 212—144)

This invention relates to tractor mounted cranes and pertains especially to a novel boom and hoist unit assembly which is removably mounted on a tractor for general utility use as a crane, clamshell, shovel, dragline scraper and the like.

The present construction is an improvement over my prior patent for Tractor Mounted Crane, No. 2,362,220, issued November 7, 1944. That patent discloses a hoist unit removably mounted on a tractor in association with a power take-off gear, and having a bull wheel for mounting a boom for use as a crane and the like employing the power of the tractor engine. An object of the present invention is to provide improvements in the mast, bull wheel and hoist unit, and the manner in which they are connected together and assembled so as to facilitate erection and either parital or complete disassembly in the field without requiring special equipment.

A particular object is to provide a pin connected boom of several sections which may be hinged together to facilitate erection, and in which the heel section is provided with means for cooperating with an auxiliary pivot on the bull wheel to guide the heel pivoting parts into position for insertion of a removable heel pin in erection.

Another object is to provide an improved construction wherein the parts are so designed and arranged that the boom and hoist unit assembly may be disconnected from the tractor and parked substantially fully assembled in a position to be readily re-attached to the tractor whereby the tractor may temporarily be used for other work and then returned to pick up the parked assembly to resume crane work and the like.

Another object is to provide a novel construction and arrangement of the bull wheel on the hoist unit whereby a plurality of cable drums or sheaves in the hoist unit are arranged to pay off their cables in a vertical direction through the center of the bull wheel and grouped closely around its axis of rotation.

Another object is to provide a novel dragline fair-lead in the heel section of the boom for receiving a dragline cable low above the ground and directing it upwardly to a masthead fair-lead above the heel of the boom.

Other objects and advantages reside in the particular construction and arrangement of parts shown in the accompanying drawings and described in the annexed specification. Various changes will become apparent to persons skilled in the art, and all such modifications are included in the invention. The present embodiment is described by way of illustration and not for purposes of limitation, the invention being limited only by the scope of the appended claims.

In the drawings:

Figure 1 is a perspective view of a crane embodying the features of the present invention and rigged for use with a dragline scraper;

Figure 2 is a plan view of the hoist unit showing the manner in which the boom and bull wheel are mounted thereon;

Figure 3 is a perspective view showing details of construction of the heel section of the boom;

Figure 4 is a view showing a manner of partially dismantling the crane by removing the boom and hoist unit from the tractor as an assembly in such condition that it can be again picked up and remounted with a minimum of effort;

Figure 5 is a rear view of the tractor showing the mounting bracket and power take-off gear for the crane mast and hoist unit;

Figure 6 is an end view of the hoist unit supported on jack legs as it would appear after being removed in the manner illustrated in Figure 4;

Figure 7 is a perspective view of an anchor bracket mounting for one of the backstay struts; and Figure 8 is a fragmentary plan view of the auxiliary boom pivot on the bull wheel.

In Figure 1, the numeral 10 refers generally to a crawler type tractor having a bulldozer 11 mounted on the front thereof. On the rear of the tractor is a mounting bracket 12, and on each of the crawler traction frames is an anchor bracket 13, the brackets 12 and 13 serving to mount various parts of the present crane structure. The crane structure comprises essentially a mast and backstay assembly comprising an A-frame mast 15 and backstay struts 16 constructed and arranged as disclosed and claimed in my copending application for Tractor Mounted Crane Mast and Backstay System, Serial No. 626,113, filed November 1, 1945, which has now matured into Patent No. 2,564,929 issued August 21, 1951. In this construction the mast 15 is pivotally mounted on heel pins 17 in the upper ends of upstanding arms 18 on the mounting bracket 12. The masthead 19 is held in the proper position by adjustable means associated with the backstay struts 16 which are connected at their lower ends with the anchor brackets 13 on the crawler traction frames. The masthead 19 carries a fair-lead 20 of the type disclosed and claimed in my copending application for Fair-Lead, Serial No. 200,035, filed December 9, 1950, which is a continuation-in-part of Serial No. 626,112, filed November 1, 1945 (now abandoned). Reference is also made to my copending application, Serial No. 626,115, filed November 1, 1945, for Tractor Mounted Crane, which claims certain features disclosed in the present application.

The mounting bracket 12 also removably supports a hoist unit 21 carrying a revolving bull wheel 22 for mounting a boom 23. In Figure 1 the crane is rigged for a dragline scraper 24 and all the lines are handled through the masthead fair-lead 20. The boom is supported by a pair of boom suspension links 25 attached to an upper boom block 26 which is in turn associated with a lower boom block 27 connected with the fair-lead by means of a pair of links 28 in the manner disclosed in detail in my copending application for Fair-Lead. The boom is raised or lowered by means of a boom suspension line 30 trained through the two blocks 26 and 27 and disposed downwardly from the fair-lead 20 to a central cable opening in the bull wheel 22. A dragline 31 and a haulback line or hoist line 32 are similarly disposed in side-by-side relation with the line 30 through the fair-lead 20 for vertical travel down to the hoist unit. As shown in Figure 2, the lines 30, 31 and 32 pass through the circular opening 33 in the bull wheel, where they are received by the sheave 34 and the winch drums 35 and 36, respectively. From the sheave 34 the boom suspension line 30 may proceed either to another winch drum in the hoist unit or back up to a hand operated winch 40 mounted on the mast 15. When the crane is rigged for hoisting, the line 32 becomes the hoist line and the scraper line 31 is not needed. When the crane is rigged for scraper operation the line 31 is trained through a pair of fair-lead rollers 41 in the heel section 42 of the boom, and certain features of the present invention are incorporated in this heel section.

As shown in Figure 3, the upper end of the heel section 42 of the boom is adapted to be pin connected to the next boom section by means of four pins 43. In this manner various boom sections may be joined together end-to-end to make a rigid boom structure of the desired length. By removing two of the pins 43 as shown in the drawing, a hinged joint results which is of assistance in erection and dismantling.

The base end of the section 42 terminates in a pair of spaced ears 44 adapted to receive heel pins 45 for pivotally mounting the boom as a whole on upstanding ears 46 on the bull wheel 22. On the under side of the boom a short distance above the ears 44 are a pair of spaced lugs or ears 47 having slanting notches 48 therein to cooperate with an auxiliary pivot bar 50 on the bull wheel 22 in a manner and for a purpose which will presently be described. The numerals 51 and 52 refer to eyes welded into the boom section for convenience in erection and dismantling and for anchoring cables for other purposes.

The previously mentioned fair-lead rollers 41 are positioned on either side of a cable opening 53 containing a sheave 54 for the dragline 31. This sheave and cable opening are placed relatively close to the heel end of the boom, so that the dragline 31 is disposed in a near vertical direction between the sheave 54 and the masthead fair-lead 20. By reason of the low mounting of the boom, the sheave 54 is positioned low above the ground for facility in scraper operations of the kind illustrated in Figure 1, and the fair-lead rollers 41 guide the scraper line 31 into the sheave 54 without undue friction as the line and scraper occasionally swing from side to side under the boom in the course of scraper operation.

The mounting of the boom is such as to allow it to swing through a vertical angle on the heel pins 45 under the control of the boom suspension line 30, and to swing through a wide horizontal angle on the bull wheel 22 which is provided with gear teeth 55 for power rotation by the hoist unit. The hoist unit 21 itself is stationary and the sheaves 34 and cable drums 35 and 36 are mounted on stationary axes therein.

When the crane is to be initially installed on the tractor, the mast and backstay system and hoist unit are mounted first, and then the boom is rigged and mounted on the bull wheel. Preparatory to mounting the boom it is preferably laid out on the ground behind the tractor with the bottom pins 43 removed from the joint at the upper end of the heel section 42. By means of a cable trained through one of the sheaves of the masthead fair-lead 20 from the hand winch 40, the bottom end of the heel section of the boom is raised so that the tractor may be backed up to position the notches 48 in the boom ears 47 on the auxiliary trunnion pivot 50 of the bull wheel. The hand winch cable is then attached to the boom adjacent the broken joint to raise this joint so that the bottom pins 43 may be reinserted to make the boom rigid, the notches 48 meanwhile turning on the pivot 50 and holding the base end of the boom in place on the bull wheel. The rigid boom is then raised to swing on the pivot 50 as a center until the holes in ears 44 and 46 are brought into registry to permit insertion of the heel pins 45. Notches 48 and trunnion pivot 50 are positioned to effect this registry when the boom is in approximately horizontal position.

The present crane structure being in the nature of a temporary tractor conversion unit, it is often desirable to have the tractor available for other work between intervals of operation in dragline scraper and crane work. By virtue of the articulated construction of the mast and backstay system as disclosed in my above-mentioned application entitled Tractor Mounted Crane Mast and Backstay System, Serial No. 626,113 (now Patent No. 2,564,929), the tractor may be used for a bulldozer or other work with the mast mounted thereon and only the hoist unit and boom removed. The present construction is designed to faciltate partial dismantling for this purpose by removal of the boom and hoist units as a sub-assembly in the manner illustrated in Figure 4.

By extending the jack legs 55 and lowering the boom to horizontal position, as shown in broken lines, the hoist unit may be unbolted from the mounting bracket 12. The boom tip may then be lowered to the ground, whereupon the boom and hoist unit will rest on the boom tip and jack legs in the position shown in full lines. The parts are held in stable position by engagement of the auxiliary pivot 50 in the notch 48 of the ears 47 whereby the overbalancing weight of the boom effects a stable tripod support for the heavy hoist unit. The hoist operator's platform 56, seat 57 and controls 58 are attached to the hoist unit 21 and remain therewith when the latter is removed from the tractor. After removing the rigging from the fair-lead 20 the tractor backstay system may be unlocked in the manner disclosed in my copending application Serial No. 626,113 (now Patent No. 2,564,929) previously referred to and the tractor driven away for tractor work utilizing the full flexibility of the crawler traction units. With the backstay system unlocked, the mast offers no serious hindrance to ordinary tractor work except in the matter of overhead clearance.

When it is desired again to erect the crane after partial dismantling as described in connection with Figure 4, the tractor backs up into the position from which it left the parked boom and hoist unit resting on its boom tip and jack legs, and the boom suspension line 30 is connected either with the hand winch 49 on the mast or with an auxiliary winch in the hoist unit 21 operable by a hand lever 53. Then the boom tip is raised by either one of these manual means to approximately horizontal position so that the hoist unit 21 may again be bolted on the mounting bracket 12. Registry of the hoist unit with the bolt holes in the mounting bracket is facilitated by raising the boom tip until the rear end of the hoist unit tilts down into the position in which it was unbolted. After the hoist unit is bolted in place the crane may again be rigged either for hoisting or dragline operation. The partial dismantling accomplished in the above described manner by removing only the boom and hoist unit is a great convenience where the same tractor must be used for various purposes, and the facility of conversion for these different purposes is one of the primary advantages of the present construction.

The removal of the boom and hoist unit in the manner illustrated in Figure 4 is intended only as an expedient to make the tractor temporarily available for other work. The removal and installation are easily accomplished in the field without extraneous equipment of any kind, so that the tractor may be said to be always available for tractor work without preliminary arrangements or facilities for the dismantling operation. My copending applications disclose in detail the manner of assembling the entire crane from separate pieces and for dismantling the crane into separate pieces, and also illustrate different ways in which the crane may be transported on a trailer or like vehicle in either partially or substantially fully assembled condition.

Figures 5 and 6 illustrate in detail the mounting bracket 12 on the rear of the tractor and the hoist unit which is mounted thereon. The bracket 12 may be made in either one or two pieces securely bolted to the rear of the tractor between the crawler traction units 61 by means of a plurality of bolts 60, so that the upstanding arms 18 are only slightly behind the rear axle of the tractor. In the present embodiment, the parts hereinabove referred to as the mounting bracket 12 actually comprise two parts, or brackets, as shown in Figure 5, each part terminating at its lower end in a ledge or shelf 62 adapted to support the lower corners 63 of the hoist unit and to guide them into proper position in erection. The lower part of the rear surface of each of the arms 18 constitutes a vertical post or wall surface against which one side of the hoist unit may securely be bolted, these two surfaces lying in a common plane. Holes 64 are provided in this surface on each bracket part to register with holes 65 in the hoist unit to receive the mounting bolts which may be four or six in number. An extension 71 may be provided on the tractor drawbar so that it is freely accessible beneath the hoist unit for hauling other equipment when the hoist unit, or even the complete crane, is mounted on the tractor. This mounting arrangement is such that the boom thrust is transmitted through the hoist unit to the mounting surfaces on the bracket parts with very little stress in the mounting bolts.

Between the two arms of the mounting bracket is a power take-off 66 having a spur gear 67 driven through the tractor transmission. When the hoist unit is mounted on the tractor, the gear 67 on the tractor meshes with a larger spur gear 68 on the hoist unit to drive the bull wheel 22 and various hoist drums. The operation of the bull wheel and hoist drums is controlled entirely through clutches having links and levers 69 connected with the operating levers 58 on the control platform 56. In Figure 6 the control platform is broken away at its supporting bracket 70, but the position of this structure on the hoist unit is shown in Figure 4. In this view the hoist unit is shown resting upon the extended jack legs 55 in the position in which it would appear if viewed from the rear in Figure 4 while parked.

Figure 7 is a detail view showing an anchor bracket 13 mounted on the frame member 14 of one of the crawler traction units 61. This bracket is shaped to clear the moving tracks and is provided with a bifurcated end 72 aligned with the direction of its backstay strut 16 for pin connection therewith. The mounting of the mast and backstay system on the tractor comprises four pin connected joints, two of these being in the ears 72 for the backstay struts and the other two being in the openings 73 in the arms 18 for receiving the mast heel pins 17. Pivotal movement in these four joints and in the connections between the backstay struts and the masthead permits vertical movement of the front end of the tractor body on its front spring when the crane is in operation, but such movement is in fact very slight. When the backstay system is unlocked in the manner disclosed in my copending application, these articulated joints permit independent flexible movements of the crawler traction units to the same extent as though the mast and backstay system were not mounted on the tractor.

Having now described my invention and in what manner the same may be used, what I claim as new and desire to protect by Letters Patent is:

1. In a boom and transmission assembly for a crane with a stationary mast, a hoist unit adapted for mounting at the side of the mast on the rear of a tractor in association with a power take-off gear, winches in said hoist unit receiving cables from a masthead fair-lead and adapted to be driven by said power take-off gear, a bull wheel mounted on rollers on the top of said hoist unit, a boom pivotally mounted on said bull wheel, and means driven by said power take-off gear for rotating said bull wheel.

2. A boom and transmission assembly for tractor mounting at the base of a stationary mast on the tractor comprising a hoist unit, means for mounting said unit on the rear of a tractor at one side of the mast and in association with a power take-off gear, a plurality of drum winches in said hoist unit arranged for operative engagement with said power take-off gear when said unit is mounted on said tractor, a rotatable bull wheel on said unit having an opening for cables leading to said winches from a masthead fair-lead, and a boom pivotally mounted on said bull wheel.

3. A boom and hoist unit assembly for tractor mounting at the base of a stationary mast on the tractor having a masthead fair-lead, comprising a hoist unit at one side of the mast, a bull wheel on said unit provided with a cable opening, a pivotally mounted boom on said bull wheel, and a plurality of cable drums disposed beneath said cable opening for directing cables vertically upwardly through said bull wheel to said fair-lead.

4. A removable assembly for tractor mounting comprising a hoist and bull wheel unit, a pair of extensible jack legs on said unit, a boom pivotally mounted on said bull wheel, and a stop member on said hoist and bull wheel unit spaced from the boom pivot to engage said boom when the latter is lowered to horizontal position whereby said boom in engagement with said stop member will overbalance the weight of said transmission unit so as to cause said assembly to rest as a tripod on the tip of the boom and said jack legs.

5. In a boom construction, a heel section for a boom, a pivotal mounting at the heel end of said section, auxiliary pivoting means on the boom adjacent said pivotal mounting, a sheave in said section for passing a cable therethrough in a vertical direction above the boom and in the general direction of the boom tip beneath the boom, a pair of elongated rollers on opposite sides of said sheave for guiding a cable thereto, and means at the other end of said section for pin attachment to another boom section.

6. In a boom construction, a heel section, a pivotal mounting means at the heel end of said section, auxiliary pivoting means on the under side of the boom adjacent said pivotal mounting, and means on the opposite end of said section for connecting another section thereto comprising a pair of transverse pin connectors on opposite sides of the boom arranged to constitute a hinged connection upon removal of certain of said pins and to constitute a rigid connection when all the pins are inserted so that when the whole boom is lying flat on the ground and said certain pins are removed the heel end of said heel section may be raised and supported by said auxiliary pivot means with said opposite end of said heel section hingedly connected with the rest of the boom.

7. A boom construction comprising a hoist and bull wheel unit, a boom pivotally mounted for vertical movement on said bull wheel, and auxiliary interengaging pivoting means on said unit and the under side of said boom adjacent said pivotal mounting for supporting and guiding the heel end of said boom into position to establish a pivotal connection at said mounting when the outer end of the boom is raised in erecting said boom.

8. In a boom construction, a hoist and bull wheel unit, a boom pivotally mounted on said bull wheel, an auxiliary trunnion pivot on said hoist and bull wheel unit arranged to engage said boom when the latter is lowered to horizontal position, and a pair of ears on the under side of said boom for engaging said trunnion pivot at the point of engagement of the boom with the trunnion pivot.

9. A boom construction comprising a hoist and bull wheel unit, a boom pivot on said bull wheel for mounting the end of a boom, an auxiliary pivot trunnion on said hoist and bull wheel unit spaced from said boom pivot to engage the boom when the latter is lowered to horizontal position, and ears on the under side of said boom adapted to engage said auxiliary trunnion to temporarily pivot said boom in erection to guide the heel end of said boom to said boom pivot for connection therewith when the outer end of the boom is raised.

10. A multi-purpose boom comprising a plurality of sections pin connected in end to end relation to make a rigid boom of different lengths, there being top and bottom pins in each of said connections whereby said boom will hinge vertically in either direction upon removal of certain of said pins, pivotal mounting means on the base section of said boom and auxiliary pivot means on the under side and near the heel end of said base section for use in erecting said boom on said pivotal mounting means.

11. A boom and hoist unit assembly for tractor mounting comprising a hoist unit having means of attachment with a tractor, a pair of jack legs extendable downwardly from said hoist unit, a bull wheel rotatably mounted on the top of said hoist unit, a boom mounted on horizontal heel pivots on said bull wheel, and auxiliary complementary horizontal pivot means on said boom and bull wheel in spaced parallel relation to said heel pivots for use in erecting the boom and in parking the assembly when it is removed from its tractor, said complementary pivot means comprising a bar on one of the members and notches on the other member to form a temporary boom rest on the bull wheel.

12. A removable assembly for tractor mounting comprising a hoist and bull wheel unit, a boom mounted on removable heel pivots on said bull wheel, jack legs on said unit, an auxiliary pivot rest on said unit adjacent said heel pivots, and complementary pivot means positioned on the boom to engage said auxiliary pivot rest and guide the movement of the boom heel for connection of the heel pivots in erection of the boom, said auxiliary pivot rest also engaging the boom for parking the assembly on its jack legs and boom tip in a convenient position for remounting on the tractor, with the boom swung outwardly from the tractor.

13. In a boom structure, a base section having pivotal mounting means for vertical movement of the boom in use, and auxiliary pivot means having an element on the underside of said base section adjacent said mounting means for temporary pivotal engagement with a supporting element adjacent said mounting means to guide said mounting means into mounting position in erection of the structure preparatory for use.

14. In a jointed boom structure for a hoist and bull wheel unit, a base section having pivotal mounting means for mounting the boom on said unit for vertical movement in use, and a pivotal element on the underside of said base section adjacent said mounting means for supported engagement with a similarly positioned complementary pivotal element on said unit when the boom is lowered to a predetermined rest position on said unit.

ROBERT C. SHOEMAKER.

REFERENCES CITED

The following references are of record in the file of this patent:

UNITED STATES PATENTS

| Number | Name | Date |
|---|---|---|
| 57,323 | Herrick | Aug. 21, 1866 |
| 234,313 | McMyler | Nov. 9, 1880 |
| 306,134 | Crane | Oct. 7, 1884 |
| 885,803 | Terry | Apr. 28, 1908 |
| 920,586 | Lasswell et al. | May 4, 1909 |
| 1,345,304 | Zied | June 29, 1920 |
| 1,453,108 | Harklow | Apr. 24, 1923 |
| 1,549,508 | Robinson | Aug. 11, 1925 |
| 1,630,800 | Page | May 31, 1927 |
| 1,767,737 | Brown | June 24, 1930 |
| 1,917,053 | Nelson et al. | July 4, 1933 |
| 2,110,753 | Zeilman | Mar. 8, 1938 |
| 2,133,406 | Shelton et al. | Oct. 18, 1938 |
| 2,362,220 | Shoemaker | Nov. 7, 1944 |